United States Patent Office 3,493,590
Patented Feb. 3, 1970

3,493,590
TRIETHYLENIC ESTERS AND ACIDS AND THEIR PREPARATION
Pierre Jean Antoine Chabardes, Lyon, France, assignor to Rhone-Poulenc S.A., Paris, France, a French body corporate
No Drawing. Filed Feb. 3, 1966, Ser. No. 524,859
Claims priority, application France, Feb. 4, 1965, 4,427
Int. Cl. C07c 69/24
U.S. Cl. 260—410.9     14 Claims

ABSTRACT OF THE DISCLOSURE 2,5,10- and 3,5,10-undecatrienoic acid esters are produced by heating butadiene with an acrylate or methacrylate in the presence of, as catalyst, an organometallic complex of zero-valent nickel.

---

This invention relates to triethylenic esters and acids and their preparation.

It is known (see French Patent No. 1,337,558) to react a conjugated diolefine with a monoolefine in the presence of, as catalyst, an organometallic complex of the iron family. When the monoolefine is activated by an aromatic radical, as for example in styrene, the condensation gives mainly cooligomers formed of 2 moles of the conjugated diene to 1 mole of the monoolefine. When, however, the monoolefine is activated by a modified carboxyl group, as for example in acrylic and methacrylic esters, amides and nitriles, the condensation gives mainly cooligomers formed of 1 mole of conjugated diene to 1 mole of monoolefine. When monoolefines activated by a modified carboxyl group are condensed, it is stated that the best results are obtained when the organometallic catalyst is an organo-cobalt complex. With butadiene and acrylic esters, esters of hepta-4,6-dienoic acid are thus preponderantly obtained.

It has now been found that if a conjugated diene, more particularly butadiene, is reacted with an acrylic or methacrylic ester in the presence of an organometallic complex of zero-valent nickel, the cooligomerisation takes place preponderantly in the ratio of two moles of diolefine to one mole of acrylic or methacrylic ester, and thus gives an ester whose acyl radical contains three double bonds.

The invention accordingly provides a process for the preparation of a triethylenically unsaturated carboxylic acid ester which comprises reacting together at least two molecular proportions of a conjugated diolefine and one molecular proportion of an acrylic or methacrylic ester in the presence of, as catalyst, an organometallic complex of zero-valent nickel.

When butadiene is reacted in accordance with the invention with an acrylic ester, a mixture of isomeric undecatrienoic acid esters is obtained having the 3 double bonds in the 2,5,10- and 3,5,10-positions.

A proportion of by-products is obtained, chiefly homo- and cooligomers of the starting olefines, and Diels-Alder adducts of the diolefine and the acrylic or methacrylic ester. The separation of the triethylenic esters from the by-products may be effected by any appropriate conventional purifying method, for example fractional distillation.

The conjugated diene may be, e.g., butadiene, isoprene or piperylene. The preferred acrylic and methacrylic esters are those of alkanols of 1 to 4 carbon atoms such as methanol and ethanol, but the use of acrylic and methacrylic esters of long-chained alcohols is not excluded. Thus, propyl, butyl, hexyl and octyl acrylates and methacrylates may be employed. The process of the invention is especially valuable as applied to the reaction of butadiene and an acrylate with an alkanol of 1 to 4 carbon atoms.

The mole ratio of diolefine to acrylic or methacrylic ester must be at least equal to 2:1 and is preferably much higher, as the excess of diolefine is not troublesome and can readily be recovered.

The catalyst is an organometallic complex of zero-valent nickel. Such catalysts may be readily formed by reduction of a nickel compound of higher valency (e.g. 2) with a reducing agent optionally in the presence of an electron donor, including substances capable of forming structures having isolated electron pairs and thus capable of acting as electron donors. The preparation of such catalysts is well known. The nickel compound employed for the preparation of the catalyst may be, e.g., a salt or a chelate complex such as, for example, an alcoholate, an alkanoate, a salt of an aromatic carboxylic acid, or the acetylacetonate. A wide variety of reducing agents are suitable, for example, the hydrides and organometallic derivatives of elements of Groups I-A, II-A, II-B and III-A of the Periodic Table such as, for example, lithium, sodium, potassium, magnesium, calcium, zinc, boron and aluminum. More particularly, the hydrides and organometallic derivatives mentioned in the aforesaid French Patent No. 1,337,558 may be used. The electron donor may be, for example, an alkyl or aryl phosphine, an alkyl or aryl phosphite, and arsine or a stibine, especially the phosphines, phosphites, arsines and stibines specifically referred to in French Patent No. 1,337,558. Other substances which can be used as electron donors include olefines, especially polyenes. It is especially convenient to use as electron donor for the preparation of the catalyst the same diene as that to be used in the cooligomerisation.

The quantity of catalyst used in the process of the invention may vary within fairly wide limits, for example from 0.1% to 5% by weight (expressed as Ni) based on the weight of acrylic or methacrylic ester. It is preferably from 1% to 3% by weight.

In practice, the zero-valent nickel catalyst is advantageously prepared in situ. For example, butadiene, an electron donor such as a phosphine or a phosphite, a divalent nickel compound, and an inert diluent are mixed, and the reducing agent is then added.

The reaction of the diene with the acrylic or methacrylic ester preferably takes place in a solvent which is inert under the operating conditions. Suitable solvents include saturated aliphatic hydrocarbons, such as hexane, heptane or octane, saturated cycloaliphatic hydrocarbons, such as cyclohexane or cyclooctane, aromatic hydrocarbons, such as benzene or toluene, alkyl ethers such as diethyl or dipropyl ether, and non-reactive cyclic ethers such as tetrahydropyran, tetrahydrofuran or dioxan.

The process may be carried out continuously or discontinuously in any apparatus capable of operating under the pressure required to keep the reaction mixture liquid at the reaction temperature. The reaction conveniently takes place at from 50° C. to 180° C., and is more rapid in proportion as the temperature is higher. In practice there is no advantage in exceeding 180° C. In addition, it is desirable to operate in an inert, e.g. nitrogen, atmosphere.

When the conjugated diene and the acrylic or methacrylic ester give a mixture of isomeric triethylenic esters, either the isomers may be separated or the mixture may be treated so as to convert the less stable isomer into the more stable isomer, e.g. by action of a base, preferably a tertiary amine, especially a trialkylamine, for example triethylamine. Thus, with a mixture of 2,5,10- undecatrienoic and 3,5,10-undecatrienoic esters, the addition of the tertiary amine converts the less stable 2,5,10-isomer into the more stable 3,5,10-isomer.

The triethylenic esters obtained by the process of the invention may be converted into trienoic acids by saponification, using any usual method. When the ester is a mixture of isomers, this saponification is accompanied by conversion of the less stable into the more stable form, so that a single trienoic acid is obtained. For example, the saponification of a mixture of 2,5,10-alkatrienoic and 3,5,10-alkatrienoic esters leads to a 3,5,10-alkatrienoic acid.

The esters and acids produced in accordance with the invention are new compounds useful, inter alia, as intermediate agents in organic synthesis. On hydrogenation, they give the corresponding saturated esters and acids. By reaction via their double bonds they are useful in the preparation of bifunctional products which are useful in the manufacture of polycondensates. They may also be employed in the manufacture of drying oil compositions.

The invention provides, more particularly, the alkyl 2,5,10-undecatrienoates and alkyl 3,5,10-undecatrienoates of the formulae:

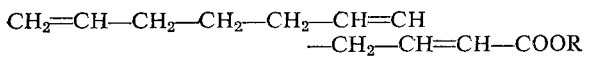

and

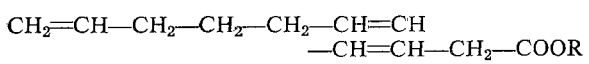

in which R represents an alkyl radical of 1 to 4 carbon atoms, more particularly methyl, ethyl, n-propyl, isopropyl, n-butyl or t-butyl, and the 3,5,10-undecatrienoic acid obtained by saponification of these esters. The esters are obtained by the condensation of two molecules of butadiene with one molecule of an alkyl acrylate of the formula:

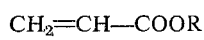

in which R is as previously defined.

The following examples illustrate the invention.

Example 1

Butadiene (15 g.), triphenylphosphine (2.4 g.), nickel acetylacetonate (2.2 g.), and anhydrous benzene (30 cc.) are introduced under a nitrogen atmosphere into a 500 cc. autoclave. When the solid compounds have dissolved in the benzene, the solution is cooled to 0° C., the autoclave is purged with nitrogen, and a solution of diethylethoxyaluminum (2.5 g.) in benzene (10 cc.) is added. An orange-red solution is thus obtained. Methyl acrylate (30 cc., 0.33 mol.) and butadiene (95 g., 1.76 mol.) are then added. The product is then heated at 100° C. for 3 hours, 45 minutes under autogenous pressure while stirring is continued. When the pressure becomes constant, the reaction product is cooled and, by distillation under 20 mm. Hg with gradual heating until the temperature of the reaction mass reaches 60° C., the unreacted butadiene is eliminated, followed by the light fractions. The heavy fractions distilling up to 150° C. under 0.3 mm. Hg are then rapidly distilled, leaving a residue of 36 g. On fractional redistillation, these heavy fractions give: 8.6 g. of a fraction B.P. 30–50° C./0.3 mm. Hg, $n_D^{25}=1.4589$, which is methyl cyclohexene carboxylate; 25 g. of a fraction B.P. 80–86° C./0.3 mm. Hg, $n_D^{25}=1.4745$; and 5.8 g. of heavy products.

The intermediate fraction is identified by infra-red spectrography and nuclear magnetic resonance as methyl 2,5,10-undecatrienoate. Saponification of this ester with sodium hydroxide followed by acidification gives 3,5,10-undecatrienoic acid, B.P. 119–120° C./0.5 mm. Hg, $n_D^{25}=1.500$. Hydrogenation of methyl 2,5,10-undecatrienoate over Adams platinum, followed by saponification, gives undecanoic acid.

If butadiene and methyl acrylate are reacted together under the same conditions but replacing the nickel acetylacetonate by cobalt (III) acetylacetonate, methyl undecatrienoate is not formed, and, apart from resinous materials, the only isolatable products are methyl cylcohexene-carboxylate and a methyl heptadienoate.

Examples 2 to 7

Proceeding in accordance with Example 1, various catalytic systems are prepared in solution in benzene, by reacting the following compounds:

| Ex. | Butadiene (g.) | Nickel complex | Electron donor | Reducing agent |
|---|---|---|---|---|
| 2 | 37 | Acetylaceonate (6.6 g.). | Triphenyl phosphine (6.7 g.) | Diethylethoxy-aluminum (7.65 g.). |
| 3 | 34 | do | Triphenyl phosphite (8 g.). | Do. |
| 4 | 37 | do | o-Diphenyl phosphite (13.8 g.). | Do. |
| 5 | 45 | do | | Do. |
| 6 | 35 | do | Triphenyl-phosphine (6.7 g.). | Triethyl-aluminium (6.5 g.). |
| 7 | 16 | Acetylacetonate (2.65 g.). | Triphenyl phosphine (2.65 g.). | Diethylethoxy-aluminium (3.4 g.). |

To the catalytic solutions thus obtained the butadiene and the acrylic ester to be reacted are added, and the mixture thus obtained is then circulated using an injection pump through a copper coil 100 metres in length and having a diameter of 6 mm., situated in a cylindrical heating jacket. The mixture is injected into the tube at a temperature of 160° C. and under pressure of 40 bars. The residence time of the mixture in the tube varies from about 7 to 30 minutes. On leaving the tube, the products are cooled and worked up as in Example 1. Mixtures of isomeric esters are thus obtained, including the esters of 2,5,10-undecatrienoic and 3,5,10-undecatrienoic acids the relative proportions of which may be determined by nuclear magnetic resonance. The results are set out in the following table. The yields indicated are based on the acrylic ester introduced.

| Example | Butadiene (g.) | Acrylate | Temperature (° C.) | Pressure (bars) | Duration (minutes) | Yield | Triethylenic esters, percent Proportion of— 2,5,10-isomer | 3,5,10-isomer | Other isomers |
|---|---|---|---|---|---|---|---|---|---|
| 2 | 160 | Methyl (107 g.) | 160 | 40 | 7 | 51 | 52 | 48 | 0 |
| 3 | 160 | do | 160 | 25 | 33 | 50 | 74 | 12 | 14 |
| 4 | 156 | do | 160 | 40 | 32 | 50 | 65 | 7.5 | 28.5 |
| 5 | 148 | do | 160 | 40 | 32 | 48 | 40 | 40 | 20 |
| 6 | 160 | do | 160 | 25 | 32 | 46.5 | 54.5 | 10.5 | 35 |
| 7 | 81 | t-Butyl (63.25 g.) | 160 | 40 | 7 | 49 | 64 | 21 | 14 |

Example 8

To the mixture of isomeric esters obtained in Example 2 triethylamine is added in a weight ratio of 6:1. The mixture is kept for 3 days with stirring at ambient temperature (20° C.). It is then taken up with diethyl ether and treated with a 10% aqueous hydrochloric acid solution to eliminate the triethylamine. The ether is evaporated and a liquid product, having a refractive index of $n_D^{25}=1.4850$, is then obtained by distillation in vacuo, B.P. 75° C./0.15 mm. Hg. It is identified by infra-red spectrography and nuclear magnetic resonance as substantially pure methyl 3,5,10-undecatrienoate.

I claim:

1. Process for the preparation of an ester of 2,5,10- or 3,5,10-undecatrienoic or of 2-methyl-2,5,10- or 2-methyl-3,5,10-undecatrienoic acid with an alkanol of 1 to 4 carbon atoms which comprises heating together at 50° to 180° C. at least two molecular proportions of butadiene and one molecular proportion of an ester of acrylic or of methacrylic acid with an alkanol of 1 to 4 carbon atoms in the presence of, as catalyst, an organometallic complex of zero-valent nickel.

2. Process according to claim 1 in which the reaction is carried out in an inert solvent and under an inert atmosphere.

3. Process according to claim 1 in which the proportion of catalyst is 0.1 to 5% by weight, calculated as nickel, based on the weight of the acrylic or methacrylic ester.

4. Process according to claim 1 in which the catalyst is prepared in situ by the reduction of a nickel compound of higher valency.

5. Process according to claim 4 in which the catalyst is prepared by reduction of nickel acetylacetonate with triethylaluminium or diethylethoxyaluminium.

6. Process according to claim 4 in which the catalyst is prepared in the presence of butadiene.

7. Process according to claim 4 in which the reduction is carried out in the presence of an electron donor selected from the group consisting of triphenylphosphine, triphenyl phosphite, and o-diphenyl phosphite.

8. Process according to claim 1 wherein the products of the reaction are treated with a tertiary amine to convert the 2,5,10-isomer to the more stable 3,5,10-isomer.

9. Process according to claim 8 in which the reaction product ester is treated with triethylamine.

10. An ester of 2,5,10- or 3,5,10-undecatrienoic acid or of 2-methyl-2,5,10- or 2-methyl-3,5,10-undecatrienoic acid with an alkanol of 1 to 4 carbon atoms.

11. An ester as claimed in claim 10 in which the alkanol is methanol.

12. An ester as claimed in claim 10 being methyl 2,5,10-undecatrienoate.

13. An ester as claimed in claim 10 being methyl 3,5,10-undecatrienoate.

14. 3,5,10-undecatrienoic acid.

References Cited

FOREIGN PATENTS 1,337,558   8/1963   France.

LORRAINE A. WEINBERGER, Primary Examiner

U.S. Cl. X.R.

260—413, 486